United States Patent [19]

Adams

[11] Patent Number: 5,288,204
[45] Date of Patent: Feb. 22, 1994

[54] GAS TURBINE ENGINE SUPPORT STRUCTURE

[75] Inventor: Anthony Adams, Nottingham, England

[73] Assignee: Rolls-Royce plc, London, United Kingdom

[21] Appl. No.: 12,434

[22] Filed: Feb. 2, 1993

[30] Foreign Application Priority Data

Mar. 10, 1992 [GB] United Kingdom ............... 9205177

[51] Int. Cl.$^5$ ............................................. F01D 25/28
[52] U.S. Cl. ............................ 415/182.1; 415/213.1
[58] Field of Search ............... 415/9, 119, 182.1, 196, 415/214.1, 213.1

[56] References Cited

U.S. PATENT DOCUMENTS 4,205,927 6/1980 Simmons .

FOREIGN PATENT DOCUMENTS 761829 11/1956 United Kingdom .
995228 6/1965 United Kingdom .

*Primary Examiner*—Richard A. Bertsch
*Assistant Examiner*—Michael S. Lee
*Attorney, Agent, or Firm*—Cushman, Darby & Cushman

[57] ABSTRACT

A ducted fan gas turbine engine is provided with a fan casing which is of double walled construction, a honeycomb cellular structure being interposed between the two walls. One of the walls has first and second substructures positioned on each side thereof. The substructures are bolted together through the wall to provide a load supporting structure for, for instance, engine control units and accessories.

5 Claims, 2 Drawing Sheets

GAS TURBINE ENGINE SUPPORT STRUCTURE

This invention relates to a gas turbine engine support structure and in particular a support structure for the fan casing of a ducted fan gas turbine engine.

A ducted fan gas turbine engine conventionally includes a core engine which drives a propulsive fan located within an appropriately shaped duct. The fan casing serves to define the radially outer extent of the gas passage through which air accelerated by the fan is directed. However the casing is, of necessity, of large diameter. Consequently in order to ensure that engine weight is maintained at acceptably low levels, the casing is arranged to be as light as possible. This can be achieved by making the casing from two sheets of material which are separated by a honeycomb material. The skins are bonded to the honeycomb material so as to provide a rigid, lightweight structure.

A casing structure of this kind is acceptable so far as its primary function is concerned. However, fan casings are additionally called upon to carry certain engine components and accessories. Typically these include electronic and power control units. If such units are bolted to the fan casing in the conventional manner, the casing is not normally sufficiently strong to carry them. Additionally, there is a tendency for the honeycomb material to buckle under the loads imposed upon it as the bolts are tightened.

It is an object of the present invention to provide a gas turbine engine casing having a support structure which substantially avoids such difficulties.

According to the present invention, a gas turbine engine casing comprises a wall member provided with a support structure for supporting a load from said wall member, said support structure comprising a first sub-structure positioned on one side of said wall member, and a second sub-structure positioned on the opposite side of said wall member to said first sub-structure, said first and second sub-structures being aligned with each other and maintained in engagement with said wall member by at least one fastener which interconnects them through a corresponding aperture in said wall member, the first of said sub-structures being provided with means for the attachment thereto of said load to be supported from said wall member, said wall member additionally having a cellular material attached thereto on the side thereof to which said second of said sub-structures is attached, a second wall member being attached to said cellular material so that said cellular material is interposed between and substantially enclosed by said wall members.

The present invention will now be described, by way of example, with reference to the accompanying drawings in which.

Figure 1:
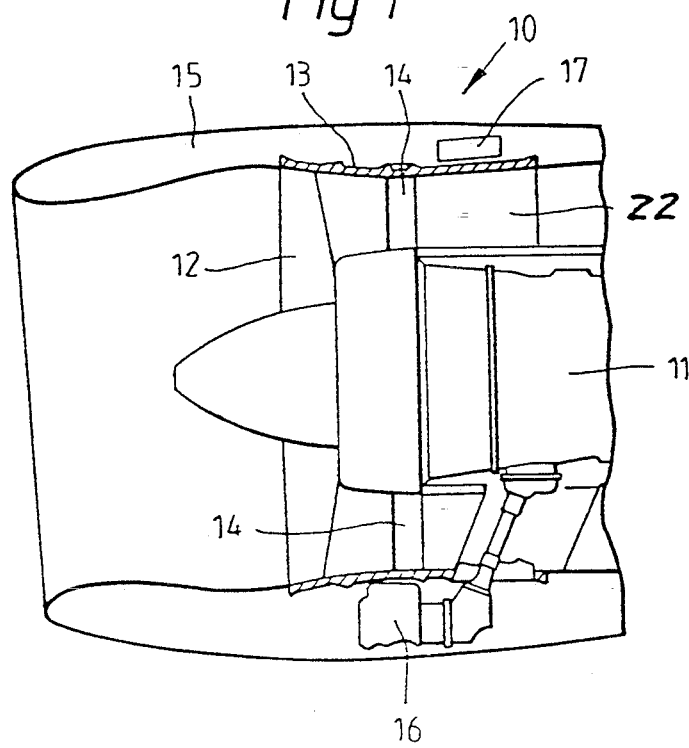
FIG. 1 is a sectioned side view of the front portion of a ducted fan gas turbine engine which incorporates a casing in accordance with the present invention.

With reference of FIG. 1 a ducted fan gas turbine engine generally indicated at 10 comprises a core engine 11 of conventional construction which drives a propulsive fan 12. The fan 12 is contained within a casing 13 which is supported from the core engine 11 by an annular array of radially extending outlet guide vanes 14. The core engine 11, fan 12 and fan casing 13 are all enclosed within an aerodynamically shaped nacelle 15.

The fan casing 13 primarily serves to define the radially outer extent of an annular passage 22 through which the propulsive air flow from the fan 12 is passed. The airflow is subsequently exhausted from the downstream region of the engine 10 to provide propulsive thrust. However, the casing 13 additionally serves to carry certain engine components and accessories. Specifically FIG. 1 shows the casing carrying a gearbox 21 and an electronic engine control unit 17. It will be appreciated however that other components and accessories, although not illustrated, are also carried by the casing 13.

Figure 2:
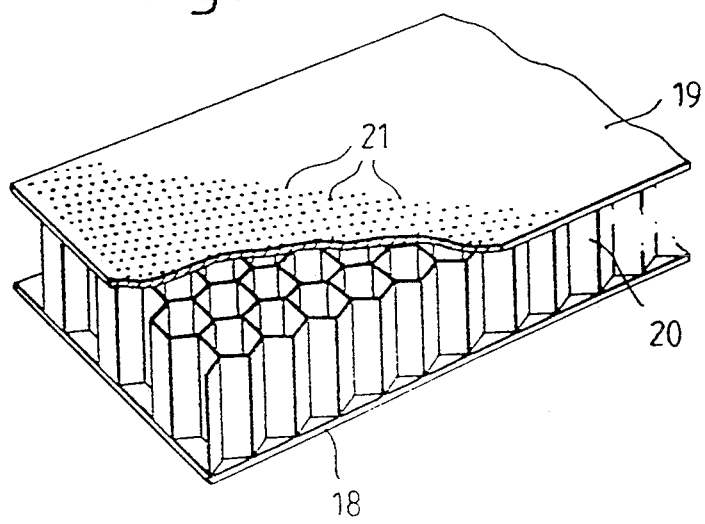
FIG. 2 is a partly broken away view of a portion of the casing of the ducted fan gas turbine engine shown in FIG. 1.

The structure of the casing 13 can be seen more easily if reference is now made to FIG. 2. It is of double wall construction, the walls 18 and 19 being made from sheet metal and held in radially spaced apart relationship by a honeycomb cellular material 20. The walls 18 and 19 are bonded to the honeycomb material 20.

The wall 18 is located radially outwardly of the wall 19 and is of greater thickness. The wall 19 defines the radially outer working fluid surface of the annular airflow passage 16. It is perforated as shown at 21 to provide communication between the airflow passage 16 and the honeycomb material 20. This promotes sound attenuation of the airflow through the passage 16.

As stated earlier, the casing 13 additionally serves to carry a variety of components and accessories. In order to achieve this without undesirably high local loads being imposed upon the casing 13, the casing 13 is provided with a number of support structures, one of which 22 can be seen if reference is now made to FIG. 3. The support structure 22 comprises first and second sub-structures 23 and 24 respectively. The first sub-structure 23 is located on the external surface of the thicker wall 18. It consists of a plate portion 25 which lies on the wall 18 and an upstanding support portion 26 attached to the plate portion 25. The support portion 26 is apertured at 27 to received a bolt or other suitable fastener device by means of which it is attached to a component or accessory to be supported by the casing 13.

Figure 4:
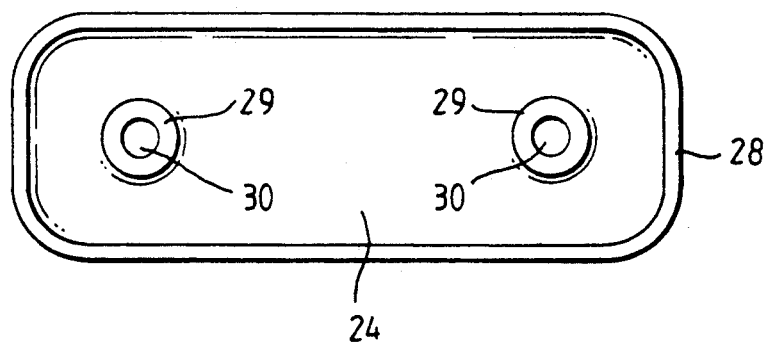
FIG. 4 is a plan view of a sub-structure of the casing of the ducted fan gas turbine shown in FIG. 1.

The second sub-structure 24 is bonded to the internal surface of the thicker wall 18. It consists of a cast metallic block, as can be seen in FIG. 4. A peripheral flange 28 on the sub-structure 24 engages the thicker wall 18. The wall 18 is also engaged by two bosses 29 located inwardly of the flange 28. The bosses 29 are provided with holes 30 which receive bolts 31. The bolts 31 extend through corresponding holes provided in the thicker wall 18 and the plate portion 25. Tightening of the bolts 31 with appropriate nuts 32 results in the sub-structures 23 and 24 being maintained in alignment with each other and in engagement with the thicker wall 18.

Figure 3:
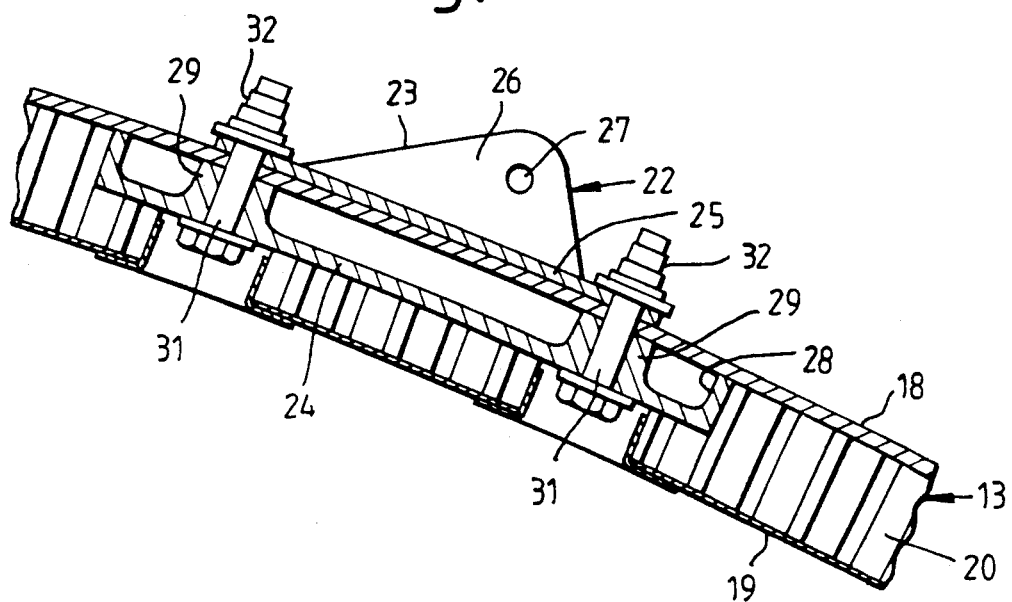
FIG. 3 is a sectioned side view of a portion of the casing of the ducted fan gas turbine engine shown in FIG. 1.

As can be seen from FIG. 3, the inner sub-structure 24 is almost completely enclosed by the honeycomb material 20; access only being provided to the bolts 31 for assembly and maintenance purposes. Such enclosure of the sub-structure 24 ensures that its presence has minimal effect upon the air flow through the annular airflow passage 16.

It will be seen therefore that together, the first and second sub-structures 23 and 24 distribute the load carried by the support portion 26 over a large area of the casing 13. This enables the casing 13 to carry loads which would otherwise cause it to distort to an undesirable extent. Moreover, the bolts 31 may be tightened to high torque levels without any danger of the honeycomb material 20 being crushed.

Although the present invention has been described with reference to a casing 13 which contains the fan 12 of the gas turbine engine 10, it will be appreciated that it could also be applied to other casings in the engine 10 which are of the same general form of double-walled construction.

I claim:

1. A gas turbine engine casing comprising a wall member, a support structure for supporting a load from said wall member, said support structure comprising a first sub-structure positioned on one side of said wall member and a second sub-structure positioned on the opposite side of said wall member to said first sub-structure, said first and second sub-structures being aligned with each other at least one fastener maintaining said first and second sub-structures in engagement with said wall member, said at least one fastener interconnecting said first and second sub-structures through a corresponding at least one aperture in said wall member, the first of said sub-structures being provided with means for the attachment thereto of said load to be supported from said wall member, and cellular material attached to said wall member on the side thereof to which said second of said sub-structures is attached, a second wall member being attached to said cellular material so that said cellular material is interposed between and substantially enclosed by said wall members.

2. A gas turbine engine casing as claimed in claim 1 wherein said at least one fastener is a bolt.

3. A gas turbine engine casing as claimed in claim 1 wherein said second sub-structure is at least partially enclosed by said cellular material.

4. A gas turbine engine casing as claimed in claim 1 wherein said cellular material is of honeycomb form.

5. A gas turbine engine casing as claimed in claim 1 wherein said casing is so configured to as to function as a fan casing.

* * * * *